United States Patent Office 3,462,504
Patented Aug. 19, 1969

3,462,504
TRANSADDITION REACTIONS OF VINYL COMPOUNDS
Alexander F. MacLean and Adin L. Stautzenberger, Corpus Christi, Tex., assignors to Celanese Corporation, a corporation of Delaware
No Drawing. Filed July 21, 1965, Ser. No. 473,839
Int. Cl. C07c 19/00, 17/02
U.S. Cl. 260—659    9 Claims

ABSTRACT OF THE DISCLOSURE

Preparation of $\alpha$-$\omega$ dihaloalkanes by reacting a vinyl compound such as ethylene together with a compound yielding halide ions in the presence of a metallic oxidizing agent such as Ce(IV), Pb(IV), Mn(IV) and Ni(IV).

---

This invention relates broadly to a process for preparing disubstituted alkanes and more particularly $\alpha,\omega$-disubstituted alkanes, especially $\alpha,\omega$-dichloro-, dibromo-, or dicyanoalkanes.

The addition of halogens to vinyl compounds such as ethylene is well known, however, only the 1,2-disubstituted compound is formed. In marked contrast, the reaction of the present invention, which is a free radical reaction, yields significant amounts of homologues of 1,2-disubstituted alkanes, particularly the 1,4- and 1,6-disubstituted alkanes. In U.S. Patent No. 3,142,708 there is described a method for preparing $\alpha,\omega$-dihaloalkanes by reacting ethylene with sulfuryl halide in the presence of an organic peroxide. Also the reaction of vinyl compounds such as ethylene with halogen ions in the presence of an inorganic symmetrical per compound such as inorganic persulfate, perphosphate, percarbonate etc. has been described in an earlier application by MacLean et al., Ser. No. 316,151, filed Oct. 14, 1963, now U.S. Patent 3,285,-981, and assigned to the assignee of the present case. More particularly there is described therein a method of preparing $\alpha,\omega$-dichloroalkanes including 1,4-dichlorobutane and 1,6-dichlorohexane by reacting ethylene and sodium chloride together in the presence of an inorganic persulfate in an aqueous medium under an ethylene atmosphere at superatmospheric pressure.

According to the process of this invention $\alpha,\omega$-disubstituted alkanes are prepared by reacting in a suitable reaction medium a vinyl compound and a compound yielding ions selected from the group consisting of chloride, bromide, and cyanide in the presence of a metallic ion oxidizing agent having an oxidation state of four selected from the group consisting of Ce(IV), Pb(IV), Mn(IV) and Ni(IV).

The compounds resulting from the process of this invention are useful per se and also as reactants in other chemical reactions. For example the 1,6-disubstituted alkanes prepared according to the above process can be reacted with ammonia to yield hexamethylenediamine, a valuable raw material in the production of nylon.

Vinyl compounds useful in the process of the invention include those which do not hydrolyze to any appreciable extent under the required reaction conditions. Illustrative of such compounds are ethylene, propylene, butadiene, styrene, vinyl chloride and acrylonitrile.

In practicing the invention any source of chlorine, bromine, and cyanide ions may be employed. Preferably the source is a water soluble material and is represented by the general formula $$M^yX_y$$

where M is a metal of Group I, Group II or Group III of the Periodic Table, X is chlorine, bromine, or cyanide and y is an integer ranging from 1 to 3. Advantageously M represents metals such as the alkali metals and alkaline earth metals. More particularly, metals such as sodium, potassium, lithium, cerium, rubidium, calcium, barium, magnesium, aluminum, antimony and cerium are applicable.

The metallic ion oxidizing agents include cerium, nickel, manganese and lead present as Ce(IV), Ni(IV), Mn(IV) and Pb(IV). These oxidizing agents can be prepared by any method yielding the required high oxidation state. For example, they may be prepared by passing oxygen through an alkaline medium containing the metallic ions in their lower oxidation states. They can also be prepared electrolytically. The preparation of these oxidizing agents forms little or no part of the instant inventions in itself.

Taking the chloride ion as illustrative of the source of the substitution ion, ethylene as illustrative of the vinyl compound and Ce(IV) as the oxidation agent, the reaction that takes place may be illustrated as follows:

The CeCl$_4$ shown in the equation is generated inside the reactor by adding desired amounts of ceric hydroxide and hydrogen chloride. This mixture generates ceric chloride at the desired low rate by the reaction:

(I)    $Ce(OH)_4 + 4HCl \rightarrow CeCl_4 + 4H_2O$

The reaction proceeds at a low rate because ceric hydroxide is insoluble and dissolves at a low rate in the reaction medium. The rate of solution of cerium hydroxide can be increased by excess acid. As the CeCl$_4$ is generated it decomposes to chlorine radicals ions which initiate and terminate ethylene polymerization.

(II)    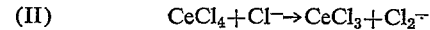

(III)    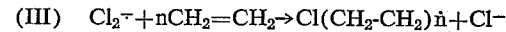

(IV)    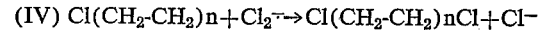

A similar reaction occurs when using other oxidation agents than Ce(IV), other vinyl compounds and other sources of the substitution ion.

The reaction is suitably carried out in the liquid phase, either aqueous or organic. Preferably the reaction medium is aqueous. Water alone, or water plus another additive such as, for example, an acid, nitrile or alcohol can be used. Additives preferably used include acetic acid, methanol, ethanol, propanol, t-butanol and acetonitrile. Suitable organic reaction media include materials described above as additives to the aqueous reaction medium.

The reaction is suitably carried out at superatmospheric pressure. Where the vinyl compound is gaseous as in the case of ethylene, the aqueous medium containing the reaction ingredients is usually maintained under an atmosphere of the vinyl compound. When the vinyl compound is a liquid a heterogeneous reaction system is formed with the vinyl compound dissolving in the suitable reaction medium according to its respective solubility under the pressure used in carrying out the reaction. More particularly the reaction is carried out under partial pressures of the vinyl compound ranging from about 50 p.s.i. to about 10,000 p.s.i. and preferably from about 100 to 200 p.s.i.g. total pressure.

The temperature of the reaction may vary between ambient temperature (20–30° C.) and 150° C., preferably from about 25 to 85° C.

The reaction may be carried out continuously, semicontinuously or by batch operation. Depending upon the particular reactants employed, the temperature of reaction and other factors which influence the reaction, the time of reaction may vary from 10 minutes to 72 hours, preferably from 1 to 24 hours.

The molar proportions of the substitution ion, i.e. chlorine, bromine, and cyanide, may be varied considerably. It is necessary, however, to maintain an acid anion concentration sufficient to give at least 3 equivalents of acid per equivalent of metallic ion oxidizing agent. When the source of the substitution ion is an alkali-metal chloride, the molar ratio of the chloride ion to the metallic ion oxidizing agent ranges from about 1 to 6 moles. The mole ratio of the vinyl compound to the metallic ion catalyst is dependent upon the solubility of the vinyl compound in the reaction medium. With respect to ethylene, as the dissolved ethylene is consumed in the reaction, additional ethylene from the atmosphere over the aqueous solution dissolves, thereby maintaining a supply of this reactant in the solution without having a large amount dissolved at any one time.

When the reaction is carried out in an aqueous reaction medium as is the preferred technique, the $\alpha,\omega$-disubstituted alkanes that are formed separate as a distinct liquid phase since they are insoluble in and heavier than the aqueous phase. The individual species of these products can be separated from each other, if desired, by fractional distillation or other suitable technique. If desired, an amount of dibutyl ether or straight chain saturated hydrocarbon having from 5 to 16 carbon atoms may be added to the reaction medium in an amount sufficient to extract the $\alpha,\omega$-disubstituted alkanes as they are formed.

Very high efficiencies can be obtained by the process according to this invention. For example, efficiencies of about 78% based on the amount of oxidizing agent used per amount of the $\alpha$-$\omega$-disubstituted alkanes produced have been obtained. From the stoichiometry involved it is believed that the efficiency based on vinyl compound to $\alpha$-$\omega$-disubstituted alkanes would be as great.

In order that those skilled in the art may better understand how the present invention can be carried into effect, the following is given by way of illustration and not by way of limitation.

Example I

The general procedure was as follows: The desired concentrations of cerium hydroxide, sodium chloride and hydrochloric acid were charged into a stainless steel, high pressure reactor and the mixture diluted with distilled water. An amount of pentane was added sufficient to extract the $\alpha$-$\omega$-disubstituted alkanes. The reactor assembly was sealed and the air in the system displaced to the desired p.s.i. with monomeric ethylene. The mixture was allowed to react for two hours at room temperature and then the temperature was raised to 70° C. and held for 22 hours. The reaction products were extracted in the pentane phase as they formed. At the end of the reaction time the reaction products were removed from the reactor. The results were as follows:

It will be understood, of course, by those skilled in the art that the present invention is not limited to the specific ingredients, proportions thereof, time and temperature of reaction and other operating conditions given in the foregoing detailed description and examples by way of illustration. For example, instead of sodium chloride, other alkali-metal salts can be used such as the alkali metal bromides. Also other oxidizing agents can be used in place of Ce(IV) such as, for example Ni(IV), Mn(IV), or Pb(IV).

The embodiments of the invention in which an exclusive property or privilege is claimed are defined as follows.

What we claim is:

1. Process for the preparation of $\alpha$-$\omega$-disubstituted alkanes which consists essentially of reacting together in the liquid phase in a suitable reaction medium ethylene and a compound yielding substitution ions selected from the group consisting of chloride, bromide, and cyanide in the presence of a metallic ion oxidizing agent having an oxidation state of four selected from the group consisting of Ce(IV), Pb(IV), Mn(IV), and Ni(VI), said compound yielding the substitution ions having the general formula $$M^y X_y$$

wherein M is a metal selected from cerium, antimony, Group I, Group II and Group III of the Periodic Table X is a member selected from the group consisting of chlorine, bromine and cyanide and $y$ is an integer ranging from 1 to 3.

2. Process according to claim 1 wherein said metallic ion is Ce(IV), the source of which is Ce(OH)$_4$.

3. Claim 1 wherein M is an alkali metal and X is chlorine.

4. Process for the preparation of $\alpha$-$\omega$ dihaloalkanes which consists essentially of contacting in an aqueous medium ethylene and a water soluble metal halide in the presence of cerium ions having an oxidation state of four, said metal halide being an alkali metal halide or alkaline earth metal halide.

5. Process according to claim 4 wherein the aqueous medium containing the specified reactants is under an ethylene atmospheric pressure.

6. Process according to claim 4 wherein the reaction is carried out at a temperature ranging between 20 and 150° C. and a pressure ranging from 50 to 10,000 p.s.i.

7. Process according to claim 4 wherein the time of reaction ranges from about 10 minutes to 72 hours.

8. Process for the preparation of $\alpha$-$\omega$ dichloroalkanes including 1,4-dichlorobutane and 1,6-dichlorohexane which consists essentially of reacting together in an aqueous medium ethylene and sodium chloride in the presence of ceric chloride, the reaction being carried out

TABLE

| | Blank | 1 | 2 | 3 | 4 | 5 | 6 | 7 | 8 |
|---|---|---|---|---|---|---|---|---|---|
| Reaction mixture: | | | | | | | | | |
| Ce(OH)$_4$, millimoles | 0 | 18.4 | 15.9 | 14.7 | 17.2 | 14.7 | 17.8 | 19.6 | 5.0 |
| HCl, millimoles | 100 | 40 | 50 | 60 | 100 | 80 | 60 | 100 | 20 |
| NaCl, millimoles | 100 | 100 | 100 | 100 | 100 | 100 | 100 | 100 | 25 |
| Pentane, ml | 20 | 20 | 20 | 20 | 20 | 20 | 20 | 20 | 40 |
| HCl to Ce(OH)$_4$, ratio millimoles | | 2.17 | 3.18 | 4.08 | 5.8 | 6.8 | | | |
| Reaction conditions: | | | | | | | | | |
| Temperature, ° C | 25–75 | 25–70 | 25–70 | 25–70 | 25–70 | 25–70 | 25–60 | 25–79 | 25–80 |
| Time, hours | 24 | 24 | 24 | 24 | 24 | 24 | 24 | 24 | 24 |
| Pressure, p.s.i.g | 175 | 175 | 175 | 175 | 175 | 175 | 1300 | 1300 | 350 |
| Reaction vol., ml | 310 | 310 | 310 | 310 | 310 | 310 | 310 | 310 | 310 |
| Percent conversion Ce(OH)$_4$ to— | | | | | | | | | |
| 1,2-dichloroethane | No | 29.90 | 33.30 | 35.04 | 22.17 | 35.04 | 07.89 | 08.82 | 10.98 |
| 1,4-dichlorobutane | products | 32.00 | 38.76 | 40.35 | 33.64 | 31.17 | 38.58 | 40.70 | 44.10 |
| 1,6-dichlorohexane | obtained | 02.30 | 02.60 | 02.92 | 03.82 | 02.24 | 16.88 | 09.14 | 11.49 |
| 1,8-dichlorooctane | | | 00.20 | 00.34 | 00.60 | 00.21 | 05.90 | 02.29 | 03.19 |
| 1,10-dichlorodecane | | | | | | | 00.63 | 00.66 | |
| 1,12-dichlorododecane | | | | | | | 00.13 | 00.16 | |
| Ce(OH)$_4$ consumed, millimoles | | 7.2 | 12.9 | 13.7 | 16.75 | 13.7 | 14.6 | 18.8 | 3.91 |
| pH reactor solution | 0.0–0.0 | 0.3–1.1 | 0.2–1.0 | 0.2–1.0 | 0.15–0.4 | 0.0–0.6 | 0.3–1.6 | 0.0–1.1 | 0.7–1.4 |
| Total conversion, percent | | 64.2 | 74.86 | 78.65 | 60.25 | 68.65 | 79.01 | 61.77 | 69.76 | under an ethylene atmosphere at superatmospheric pressure.

9. Process for the preparation of α-ω dibromoalkanes including 1,4-dibromobutane and 1,6-dibromohexane which consists essentially of reacting together in an aqueous medium ethylene and sodium bromide in the presence of ceric chloride, the reaction being carried out under an ethylene atmosphere at superatmospheric pressure.

References Cited

UNITED STATES PATENTS

| | | | |
|---|---|---|---|
| 2,698,348 | 12/1954 | Giraitis | 260—659 |
| 2,750,403 | 6/1956 | Calkins | 260—465.8 |
| 2,768,196 | 10/1956 | Huemer et al. | 260—465.8 X |
| 3,142,708 | 7/1964 | Young | 260—659 X |
| 3,194,847 | 7/1965 | Capp et al. | 260—659 X |
| 3,282,981 | 11/1966 | Davis | 260—465.8 X |
| 3,285,981 | 11/1966 | MacLean et al. | 260—659 |
| 2,405,948 | 8/1946 | Gresham | 260—659 |
| 3,329,704 | 7/1967 | Goebel et al. | 260—659 |

BERNARD HELFIN, Primary Examiner.

T. G. DILLAHUNTY, Assistant Examiner

U.S. Cl. X.R.

260—465.8, 651

UNITED STATES PATENT OFFICE
CERTIFICATE OF CORRECTION

Patent No. 3,462,504                               August 19, 1969

Alexander F. Mac Lean et al.

It is certified that error appears in the above identified patent and that said Letters Patent are hereby corrected as shown below:

Column 4, line 22, "Ni(VI)" should read -- Ni(IV) --. Column 5, line 5, "aqueour" should read -- aqueous --. Columns 3 a1 4, in the table, first column, line 1 thereof, "Raction" should read -- Reaction --; in the column numbered 6, "79.01" should read -- 70.01 --; in the column numbered 7, "25-79" should read -- 25-70 --.

Signed and sealed this 2nd day of March 1971.

(SEAL)
Attest:

Edward M. Fletcher, Jr.                          WILLIAM E. SCHUYLER, JR.
Attesting Officer                                            Commissioner of Patents